(12) United States Patent
Koyama et al.

(10) Patent No.: US 11,341,935 B2
(45) Date of Patent: May 24, 2022

(54) DATA RELAY DEVICE AND DISPLAY DEVICE

(71) Applicant: Keyence Corporation, Osaka (JP)

(72) Inventors: Takamasa Koyama, Osaka (JP); Yohei Hashimoto, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 32 days.

(21) Appl. No.: 17/111,715

(22) Filed: Dec. 4, 2020

(65) Prior Publication Data

US 2021/0233498 A1  Jul. 29, 2021

(30) Foreign Application Priority Data

Jan. 23, 2020 (JP) .............................. JP2020-008986

(51) Int. Cl.
  *G09G 5/37*  (2006.01)
  *G09G 5/39*  (2006.01)
(52) U.S. Cl.
  CPC .................. *G09G 5/37* (2013.01); *G09G 5/39* (2013.01); *G09G 2354/00* (2013.01); *G09G 2370/02* (2013.01)
(58) Field of Classification Search
  None
  See application file for complete search history.

(56) References Cited

U.S. PATENT DOCUMENTS

| | | | |
|---|---|---|---|
| 5,818,123 A | 10/1998 | Iwasaki et al. | |
| 7,006,942 B2 | 2/2006 | Fukumura | |
| 8,237,587 B2 | 8/2012 | Fukumura | |
| 8,344,895 B2 | 1/2013 | Uozumi et al. | |
| 8,346,510 B2 | 1/2013 | Fukumura et al. | |
| 8,378,780 B2 | 2/2013 | Hanada et al. | |
| 2011/0035187 A1* | 2/2011 | Dejori ................. | G06F 11/3476 702/187 |
| 2012/0310599 A1* | 12/2012 | Tanaka ................. | A01B 79/005 702/189 |
| 2020/0125060 A1 | 4/2020 | Fujimura | |
| 2020/0125061 A1 | 4/2020 | Miyasaka | |
| 2020/0209027 A1 | 7/2020 | Yamazaki | |

(Continued)

FOREIGN PATENT DOCUMENTS

JP  2017167595 A  9/2017

*Primary Examiner* — Yi Wang
(74) *Attorney, Agent, or Firm* — Kilyk & Bowersox, P.L.L.C.

(57) ABSTRACT

An object is to enhance usability when browsing through a measurement result from a sensor on an external computer. A data relay device includes a first connection part to which one or more sensors are connected, a second connection part to which an industrial network for communication with a control device is connected, a relay memory that temporarily stores first data received from the one or more sensors connected to the first connection part to relay the first data to the control device via the second connection part, a third connection part to which a computer network for communication with an external computer is connected, a creation unit that creates display screen information for use in displaying the first data stored in the relay memory in a predetermined display form, and a provision unit that provides the display screen information to the external computer via the third connection part.

20 Claims, 12 Drawing Sheets

(56) References Cited

U.S. PATENT DOCUMENTS

2020/0259998 A1   8/2020  Tsujikawa
2020/0310733 A1  10/2020  Fujimura et al.
2021/0176299 A1*  6/2021  Ishino ................. H04L 67/2823

* cited by examiner

FIG. 3

OUTPUT FORMAT: 0=Current Value and Output — 28a

| Bit15 | Bit14 | Bit13 | Bit12 | Bit11 | Bit10 | Bit9 | Bit8 | Bit7 | Bit6 | Bit5 | Bit4 | Bit3 | Bit2 | Bit1 | Bit0 |
|---|---|---|---|---|---|---|---|---|---|---|---|---|---|---|---|
| | | | | | | SENSOR DISPLAY VALUE | | | | | | 0 | 0 | 0 | OUTPUT 1 |

OUTPUT FORMAT: 1=Current Value — 28b

| Bit15 | Bit14 | Bit13 | Bit12 | Bit11 | Bit10 | Bit9 | Bit8 | Bit7 | Bit6 | Bit5 | Bit4 | Bit3 | Bit2 | Bit1 | Bit0 |
|---|---|---|---|---|---|---|---|---|---|---|---|---|---|---|---|
| | | | | | | | | SENSOR DISPLAY VALUE | | | | | | | |

OUTPUT FORMAT: 2=Distance and Output — 28c

| Bit15 | Bit14 | Bit13 | Bit12 | Bit11 | Bit10 | Bit9 | Bit8 | Bit7 | Bit6 | Bit5 | Bit4 | Bit3 | Bit2 | Bit1 | Bit0 |
|---|---|---|---|---|---|---|---|---|---|---|---|---|---|---|---|
| | | | | | DISTANCE FROM SENSOR TO WORKPIECE | | | | | | | 0 | 0 | 0 | OUTPUT 1 |

OUTPUT FORMAT: 3=Distance — 28d

| Bit15 | Bit14 | Bit13 | Bit12 | Bit11 | Bit10 | Bit9 | Bit8 | Bit7 | Bit6 | Bit5 | Bit4 | Bit3 | Bit2 | Bit1 | Bit0 |
|---|---|---|---|---|---|---|---|---|---|---|---|---|---|---|---|
| | | | | | | | DISTANCE FROM SENSOR TO WORKPIECE | | | | | | | | |

FIG. 4

| DEVICE ID | OUTPUT FORMAT | BIT ADDRESS | TYPE | CHART TYPE |
|---|---|---|---|---|
| ##1 | 0 | #0-#9 | 10-bit INTEGER | LINE CHART |
| | | #10-#15 | 5-bit SIGNED | BAR CHART |
| | 1 | #0-#9 | 10-bit INTEGER | LINE CHART |
| | | #10-#13 | 4-bit INTEGER | METER CHART |
| | | #14 | 1bit | LAMP A |
| | | #15 | 1bit | LAMP B |
| | 2 | #0-#15 | 16bit | BAR CHART |
| ##2 | 0 | #0-#15 | 16bit | LINE CHART |
| ##3 | 0 | #0-#4 | 5-bit SIGNED | BAR CHART |
| | | #5-#9 | 5-bit SIGNED | BAR CHART |
| | | #10 | 1bit | LINE CHART |
| | | #11-#15 | 5-bit SIGNED | METER CHART |

| DEVICE ID | ERROR ID | ERROR NAME | RELEVANT DOCUMENT |
|---|---|---|---|
| ##1 | #0 | HIGH TEMPERATURE | DocumentA |
| | #1 | LOW TEMPERATURE | DocumentA |
| | #2 | COMMUNICATION ERROR | DocumentB |
| ##2 | #0 | LOW LIGHT INTENSITY | DocumentC |
| | #1 | INTERNAL ERROR | DocumentD |
| ##3 | #0 | NON-FULL | DocumentE |
| | #1 | LOW SIGNAL INTENSITY | DocumentE |
| | #2 | HIGH TEMPERATURE | DocumentF |
| | #3 | DISTURBANCE NOISE | DocumentG |

DATA RELAY DEVICE AND DISPLAY DEVICE

CROSS-REFERENCE TO RELATED APPLICATIONS

The present application claims foreign priority based on Japanese Patent Application No. 2020-008986, filed Jan. 23, 2020, the contents of which are incorporated herein by reference.

BACKGROUND OF THE INVENTION

1. Field of the Invention

The present invention relates to a data relay device and a display device.

2. Description of Related Art

A programmable logic controller (PLC) controls a large number of industrial machines in a product factory that produces products.

In such a factory, a data relay device such as an IO-Link (registered trademark) master that connects a sensor or actuator located away from the PLC to a network to which the PLC is connected and relays a measurement result from the sensor to the PLC is used (JP 2017-167595 A).

The measurement result from the sensor is associated with a device of the PLC or the like. Therefore, when connecting a PLC configuration tool or a human machine interface (HMI) (e.g. a display with a touchscreen) to the PLC to acquire and display these device values, the user can check the measurement result. However, for example, during start-up of a PLC system that controls an industrial machine or when an abnormality has occurred in the system, the PLC or the network to which the PLC is connected may not be available. In such a case, the user will not be able to check the measurement result from the sensor.

Given this situation, it would be convenient for the user if the user could check the measurement result from the sensor in graphical form without going through the PLC.

The data relay device described above has two communication protocols implemented therein. The first communication protocol is used when the data relay device communicates with the sensor to acquire information such as the measurement result from the sensor. The second communication protocol is used when the data relay device communicates with the PLC. That is, the data relay device uses the first communication protocol to acquire the measurement result from the sensor and uses the second communication protocol to transmit the measurement result to the PLC. The measurement result from the sensor is acquired as a data string in various data formats. That is, the data formats of the measurement result are generally different for each sensor. The PLC can use the measurement result from the sensor for control by interpreting communication data with taking the data format of the data string into consideration using a user program. Note that the data relay device described above can relay the data string to the PLC even without knowing the data format; therefore, the data relay device described above does not interpret the data string with taking the data format into consideration. However, in order to check the measurement result from the sensor without going through the PLC, it is necessary to interpret the data string with taking the data format into consideration. Therefore, it is necessary for the data relay device (remote IO device or the like) to correctly interpret the data format for each sensor, extract the measurement result, and transmit the measurement result to an external computer (the PLC configuration tool or the HMI). Further, a suitable display form (e.g. a bar chart or a line chart) differs in a manner that depends on the type of measurement result. Therefore, the suitable display form differs in a manner that depends on the type of sensor or the type of measurement result.

SUMMARY OF THE INVENTION

It is therefore an object of the present invention to enhance usability when browsing through a measurement result from a sensor on an external computer without going through a PLC or even when a network to which the PLC is connected is unavailable.

Provided according to an aspect of the present invention is, for example a data relay device including a first connection part to which one or more sensors are connected, a second connection part to which an industrial network for use in communication with a control device is connected, a relay memory that temporarily stores received information received from the one or more sensors connected to the first connection part to relay the received information to the control device via the second connection part, a third connection part to which a computer network for use in communication with an external computer is connected, a creation unit that creates display screen information for use in displaying the received information stored in the relay memory in a predetermined display form, and a provision unit that provides the display screen information to the external computer via the third connection part.

According to the aspect of the present invention, usability when browsing through the measurement result from the sensor on the external computer is enhanced.

BRIEF DESCRIPTION OF THE DRAWINGS

FIG. 3 is a diagram for describing process data;
FIG. 4 is a diagram for describing a display form table;
FIG. 6 is a diagram for describing an error table.

DETAILED DESCRIPTION OF PREFERRED EMBODIMENTS

Figure 1:
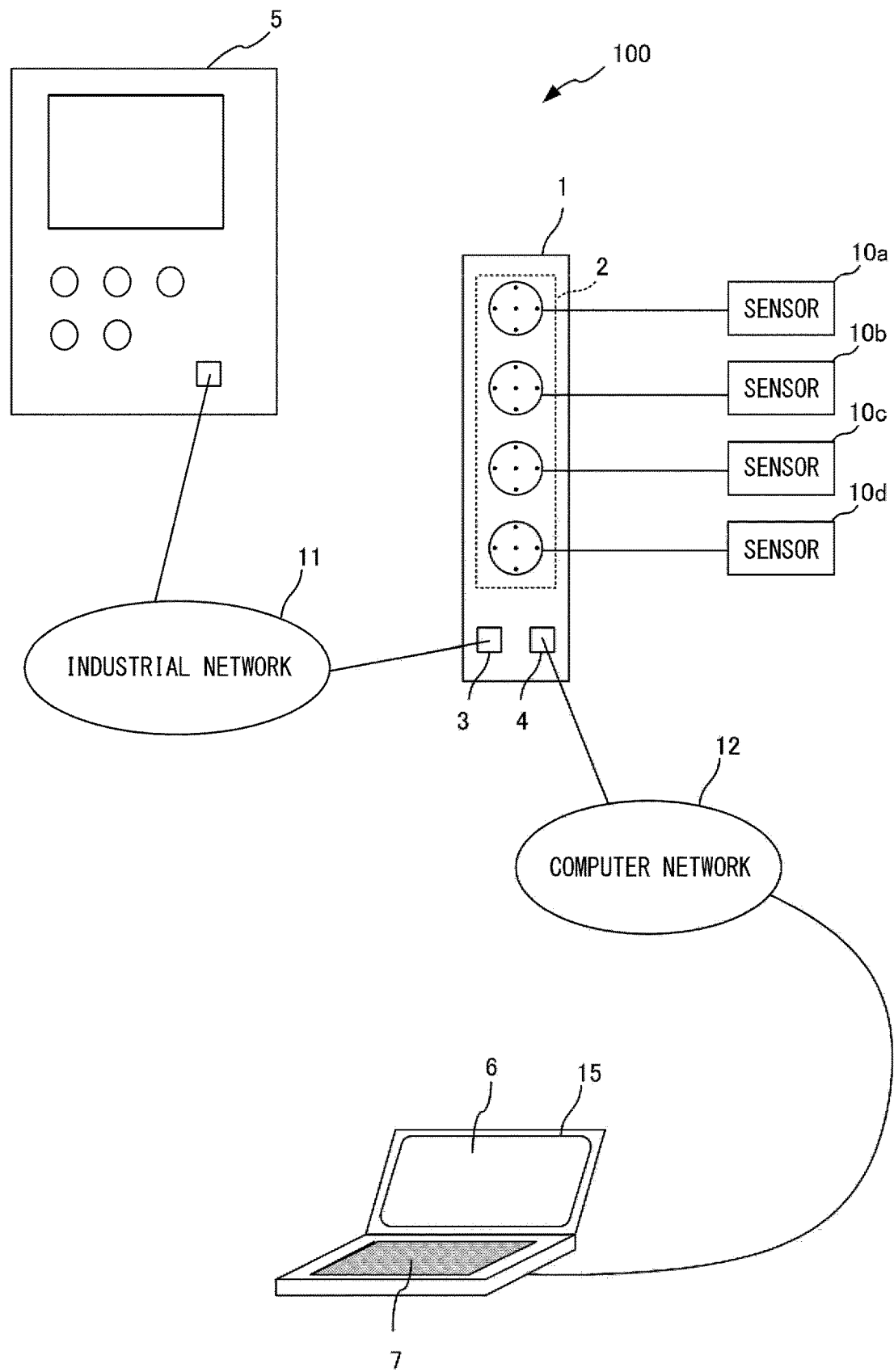
FIG. 1 is a diagram for describing a PLC system.

An embodiment will be described below in detail with reference to the accompanying drawings. Note that the following embodiment is not intended to restrict the invention according to the claims, and all combinations of the features described in the embodiment are not essential to the invention. Two or more of the plurality of features described in the embodiment may be selectively combined. Further, the same or similar components are denoted by the same reference numerals, and no repetition of the same description is made.

(PLC System)

FIG. 1 shows a PLC system 100. A PLC 5 is a control device that controls an output device (e.g. an actuator) connected to the PLC 5 based on data input from an input device (e.g. a sensor) connected to the PLC 5. The PLC 5 includes an I/O terminal that allows the input device and the output device to be directly connected to the PLC 5. On the other hand, the input device and the output device may be indirectly connected to the PLC 5 via a remote IO device 1. The remote IO device 1 includes a first connector 2, a second connector 3, and a third connector 4. The first connector 2 includes a plurality of IO terminals to which a sensor 10 is connected. The first connector 2 may include, for example, a plurality of round connectors each including a plurality of terminals adapted to the sensor 10. Each of the round connectors includes three to five terminals, for example, two power terminals for supplying direct current (DC) power to the sensor 10, and a terminal for use in communication. The second connector 3 is connected to an industrial network 11. The remote IO device 1 relays a measurement result acquired from the sensor 10, or the like to the PLC 5 over the industrial network 11. Note that the remote IO device 1 cyclically acquires the measurement result from the sensor 10 and transfers the measurement result to the PLC 5. The third connector 4 is connected to a computer network 12. The remote IO device 1 extracts received information such as the measurement result transferred from the sensor 10 to the PLC 5 to create display screen information, and transfers the display screen information to the PC 15 over the computer network 12. Upon receipt of the display screen information, the PC 15 creates a display screen based on the display screen information and displays the display screen on a display part 6. The PC 15 includes an operation part 7 such as a keyboard or a pointing device.

Upon receipt of identification information from the sensor 10 connected to the first connector 2, the remote IO device 1 recognizes the sensor 10. The remote IO device 1 identifies a data format of the received information including the measurement result transmitted from the sensor 10 based on the identification information and further identifies a display form suitable for displaying the measurement result. The remote IO device 1 extracts the measurement result from the received information in the data format thus identified. The remote IO device 1 creates the display screen information (e.g. an html file, cascading style sheet (css) data, and javascript (registered trademark) data) for use in displaying the measurement result in the display form thus identified, and provides the display screen information to the PC 15.

(Remote IO Device)

Figure 2:
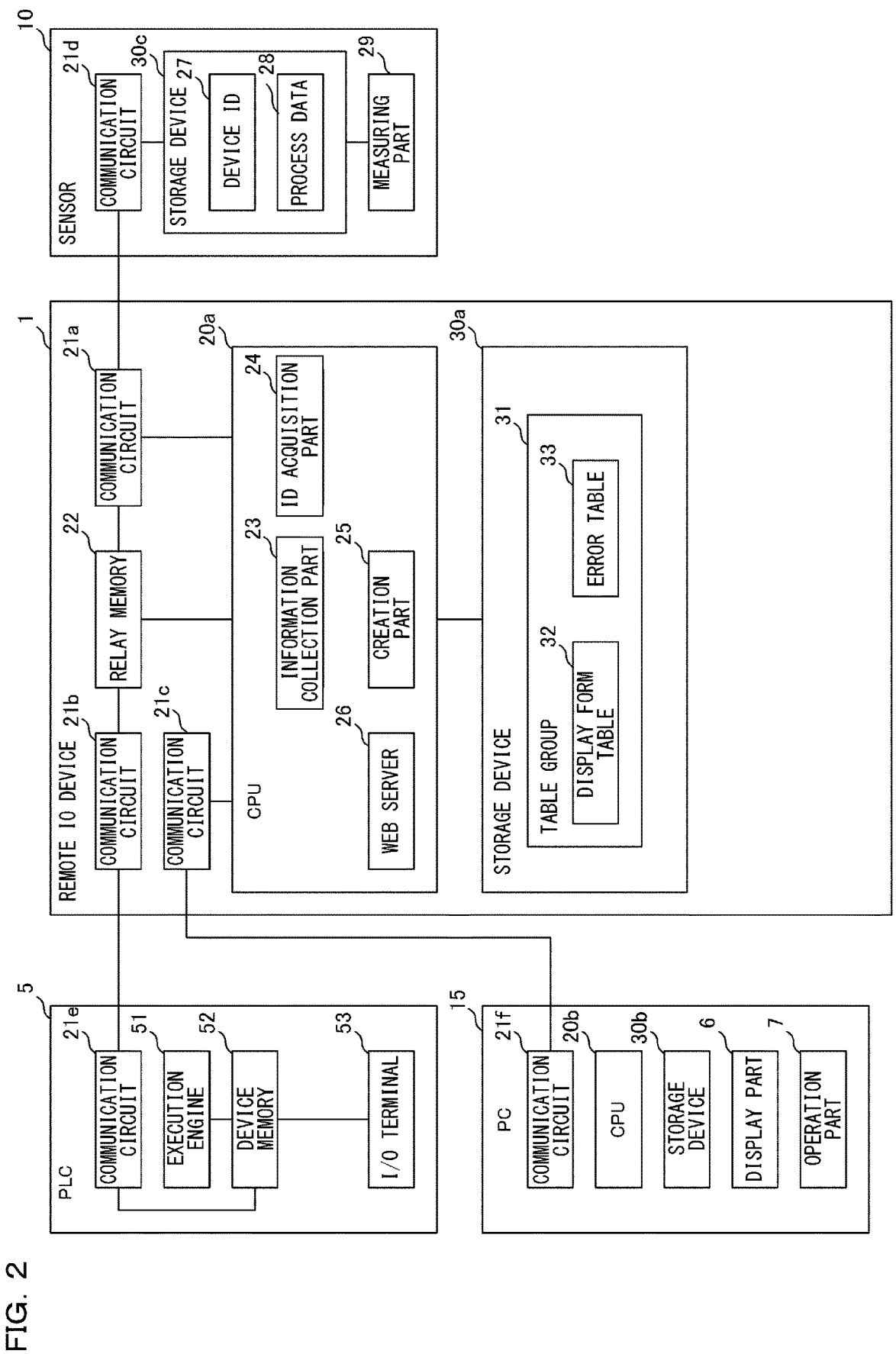
FIG. 2 is a diagram for describing hardware.

FIG. 2 shows an internal structure of the PLC system 100. The remote IO device 1 includes a CPU 20a, a storage device 30a, a relay memory 22, and communication circuits 21a, 21b, 21c. The remote IO device 1 may be a so-called IO-Link (registered trademark) master. The communication circuit 21a communicates with the sensor 10 in accordance with a predetermined communication protocol (e.g. IEC61131-9), receives the identification information or the measurement result, and stores the identification information or the measurement result in the relay memory 22. Note that the measurement result is cyclically (periodically) received and transferred to the PLC 5 via the relay memory 22. The communication circuit 21b is a circuit that communicates with the PLC 5 over the industrial network 11. The industrial network 11 may be, for example, a network such as Ether-Net/IP (registered trademark), PROFINET (registered trademark) or EtherCAT (registered trademark) based on Ethernet (registered trademark). When the PLC 5 executes I/O refresh, the communication circuit 21b transfers (transmits) the measurement result held in the relay memory 22 to the PLC 5.

First intervals (collection intervals) at which the remote IO device 1 acquires information from the sensor 10 and second intervals (control intervals [refresh intervals]) at which the remote IO device 1 transmits information to the PLC 5 may be the same or different. When the first intervals are longer than the second intervals, the number of pieces of data acquired by the PLC 5 becomes relatively small, and a data processing load applied to the PLC 5 becomes small accordingly. When the first intervals are shorter than the second intervals, the PLC 5 can acquire a value of the sensor 10 without fail, but acquires the same value a plurality of times, which increases the load applied to the PLC.

The communication circuit 21c is a communication circuit for use in communication with the PC 15 that is an external computer. The computer network 12 may be a wired LAN, a wireless LAN, the Internet, or the like. The CPU 20a implements various functions in accordance with a control program stored in the storage device 30a. An information collection part 23 repeatedly collects the measurement result received from the sensor 10 and stored in the relay memory 22, and stores the measurement result in a buffer area allocated in the storage device 30a. An ID acquisition part 24 acquires the identification information on (e.g. a device ID of) the sensor 10 through communication with the sensor 10 via the communication circuit 21a. A creation part 25 identifies the data format or display form associated with the device ID by reference to a display form table 32 included in a table group 31. The creation part 25 extracts the measurement result from the received information in the data format thus identified to create the display screen information for use in displaying the measurement result in the display form thus identified. A web server 26 provides the display screen information to the PC 15. The table group 31 may include an error table 33. The error table 33 holds an association among the device ID, an error ID, an error name, and a relevant document. The CPU 20a may acquire the error name and the relevant document associated with the device ID and the error ID received from the sensor 10 based on the error table 33 and provide the error name and the relevant document to the PC 15.

(Sensor)

As described above, the sensor 10 is connected to the first connector 2 (e.g. the IO terminal such as a round connector) and is put into operation upon receipt of DC power supply. The sensor 10 further includes a sensing element such as an ultrasonic element or a photovoltaic element, and measures a state quantity or physical quantity of an object to be measured by using the sensing element. Examples of the sensor 10 include an ultrasonic flow sensor, a pressure sensor, a laser range sensor, and the like.

The ultrasonic flow sensor includes, for example, a pair of ultrasonic elements arranged on upstream and downstream sides of a pipe through which a fluid flows, and causes one of the ultrasonic elements located on the upstream side to emit an ultrasonic signal to the fluid in the pipe. The ultrasonic element may be used for both transmission and reception. The ultrasonic flow sensor measures a difference in propagation time between an ultrasonic signal emitted and received from the upstream side toward the downstream side and an ultrasonic signal emitted and received from the downstream side toward the upstream side and calculates a flow rate based on the difference in propagation time. Further, the ultrasonic flow sensor compares the flow rate thus calculated with a preset threshold to generate a determination output (ON/OFF signal) representing a result of the comparison.

The pressure sensor is, for example, a sensor that includes a strain gauge disposed on a diaphragm and calculates pressure from a resistance value of the strain gauge. Further, the pressure sensor compares the pressure thus calculated with a preset threshold to generate a determination output (ON/OFF signal) representing a result of the comparison.

The laser range sensor includes, for example, a laser light source that outputs laser light, a collimator lens that converts the laser light output from the laser light source into spot light, and a photovoltaic element that receives the spot light reflected off an object to be measured. The laser range sensor measures a time from when the laser light is emitted to when the laser light is received and calculates a distance to the object to be measured based on the time thus measured. Further, the laser range sensor compares the distance thus calculated with a preset threshold to generate a determination output (ON/OFF signal) representing a result of the comparison.

A communication circuit 21d of the sensor 10 transmits the identification information or the measurement result to the remote IO device 1 in accordance with a predetermined communication protocol (e.g. IEC61131-9). A storage device 30c stores a device ID 27 and process data 28 of the sensor 10. The process data 28 is communication data including the measurement result. A measuring part 29 acquires the measurement result from the sensor 10 such as the flow rate, pressure, distance, or determination output (ON/OFF signal), creates the process data 28 representing the measurement result, and stores the process data 28 in the storage device 30c. The communication circuit 21d reads the process data 28 from the storage device 30c and transmits the process data 28 to the remote IO device 1 at regular communication intervals or in response to the receipt of a transmission request.

(PLC)

A communication circuit 21e of PLC 5 communicates with the remote IO device 1 over the industrial network 11. The communication circuit 21e stores the measurement result from the sensor 10 received via the remote IO device 1 in a predetermined storage area (e.g. data memory, relay device, word device) in a device memory 52. The communication circuit 21e may make either cyclic communication through which data is acquired from the remote IO device 1 at predetermined communication intervals or message communication through which data is acquired as a response to a transmitted command. Further, which of a plurality of bytes making up the received data is assigned to which device (storage area in the device memory 52) is predefined. In accordance with this definition, the communication circuit 21e stores various pieces of information included in the received data in associated devices. An execution engine 51 executes a user program created by the user (e.g. a ladder program). An I/O terminal 53 is a terminal to which a sensor, an actuator, or the like is connected. The remote IO device 1 corresponds to an extension of the I/O terminal 53.

(PC (External Computer))

The PC 15 is a desktop PC, a laptop PC, a tablet PC, a smartphone, or the like. A communication circuit 21f is a circuit that communicates with the remote IO device 1 over the computer network 12. The communication circuit 21f may be a wired communication circuit or a wireless communication circuit. A CPU 20b displays the display screen on the display part 6 in accordance with the display screen information received from the remote IO device 1 via the communication circuit 21f. For example, the CPU 20b may execute a program stored in a storage device 30b to serve as a web browser. The web browser makes access to the web server 26 to acquire the display screen information and displays, on the display part 6, the display screen based on the display screen information.

(Process Data)

FIG. 3 shows four pieces of process data 28a to 28d having different output formats, taking a case where the sensor 10 is a range sensor as an example. The sensor 10 creates the process data 28 in a preselected output format at predetermined measurement intervals and transmits the process data 28 to the remote IO device 1. The output format is selected, for example, during setup of each sensor 10. For convenience of explanation, each of the pieces of process data 28a to 28d is two-byte data. Bit0 to Bit15 may be referred to as a bit address.

In the process data 28a in an output format "0", a sensor display value is stored in Bit4 to Bit15. The determination output (ON/OFF signal) is stored in Bit0. Other data is stored in Bit1 to Bit3. The sensor display value is data displayed on a display device of the sensor 10.

In the process data 28b in an output format "1", the sensor display value is stored in Bit0 to Bit15.

In the process data 28c in an output format "2", a distance from the sensor 10 to a workpiece is stored in Bit4 to Bit15. Other data is stored in Bit0 to Bit4.

In the process data 28d in an output format "3", the distance from the sensor 10 to the workpiece is stored in Bit0 to Bit15.

The meaning of each bit differs for each output format; therefore, the output format needs to be identified for each sensor 10. Further, the number of output formats that can be selected by the user may differ for each sensor 10.

When the sensor 10 is a range sensor, the amount of light received by the sensor may be stored in the process data 28, provided that a corresponding output format is selected. An ON/OFF signal regarding a detection margin may be stored in the process data 28. A signal indicating insufficient light intensity or excessive light intensity may be stored in the process data 28. Further, statistics such as the maximum value, the minimum value, and the mean value may be stored in the process data 28.

When the sensor 10 is a pressure sensor, a temperature may be stored in the process data 28, provided that a corresponding output format is selected. Further, an ON/OFF signal regarding a detection margin may be stored in the process data 28. Statistics such as the maximum value, the minimum value, and the mean value may be stored in the process data 28.

When the sensor 10 is a flow sensor, an integrated flow rate may be stored in the process data 28, provided that a corresponding output format is selected. Further, an ON/OFF signal regarding a detection margin may be stored in the process data 28. A signal indicating insufficient signal intensity or a flow direction may be stored in the process data 28. Further, statistics such as the maximum value, the minimum value, and the mean value may be stored in the process data 28.

(Display Form Table)

FIG. 4 shows the display form table 32. The display form table 32 stores an association among the device ID of the sensor 10, the output format of the process data 28, the data format (bit address, data type) of the process data 28, and a chart type (display form). In this example, since the process data is two-byte data, there are 16 bits (Bit0 to Bit15) available. The bit address indicates one of Bit0 to Bit15. The CPU 20a of the remote IO device 1 acquires the device ID and output format of each sensor 10 via the communication circuit 21a. The creation part 25 identifies the data format and chart type associated with the pair of the device ID and the output format acquired from the sensor 10 by reference to the display form table 32. For example, when the device ID is "1" and the output format is "0", the CPU 20a becomes aware that a 10-bit integer is stored in Bit0 to Bit9 of the process data 28 and needs to be displayed in a line chart. The CPU 20a (creation part 25) creates display screen information on the line chart on which the data stored in Bit0 to Bit9 is plotted. Furthermore, the CPU 20a becomes aware that a 5-bit signed integer is stored in Bit10 to Bit15 of the process data 28 and needs to be displayed in a bar chart. The CPU 20a (creation part 25) creates display screen information for use in displaying the data stored in Bit10 to Bit15 in the bar chart. In FIG. 4, a lamp A and a lamp B are lamp indicators (display objects) arranged on the display screen and are turned on and off based on a corresponding one bit specified by a Bit address.

(Display Screen)

Figure 5:
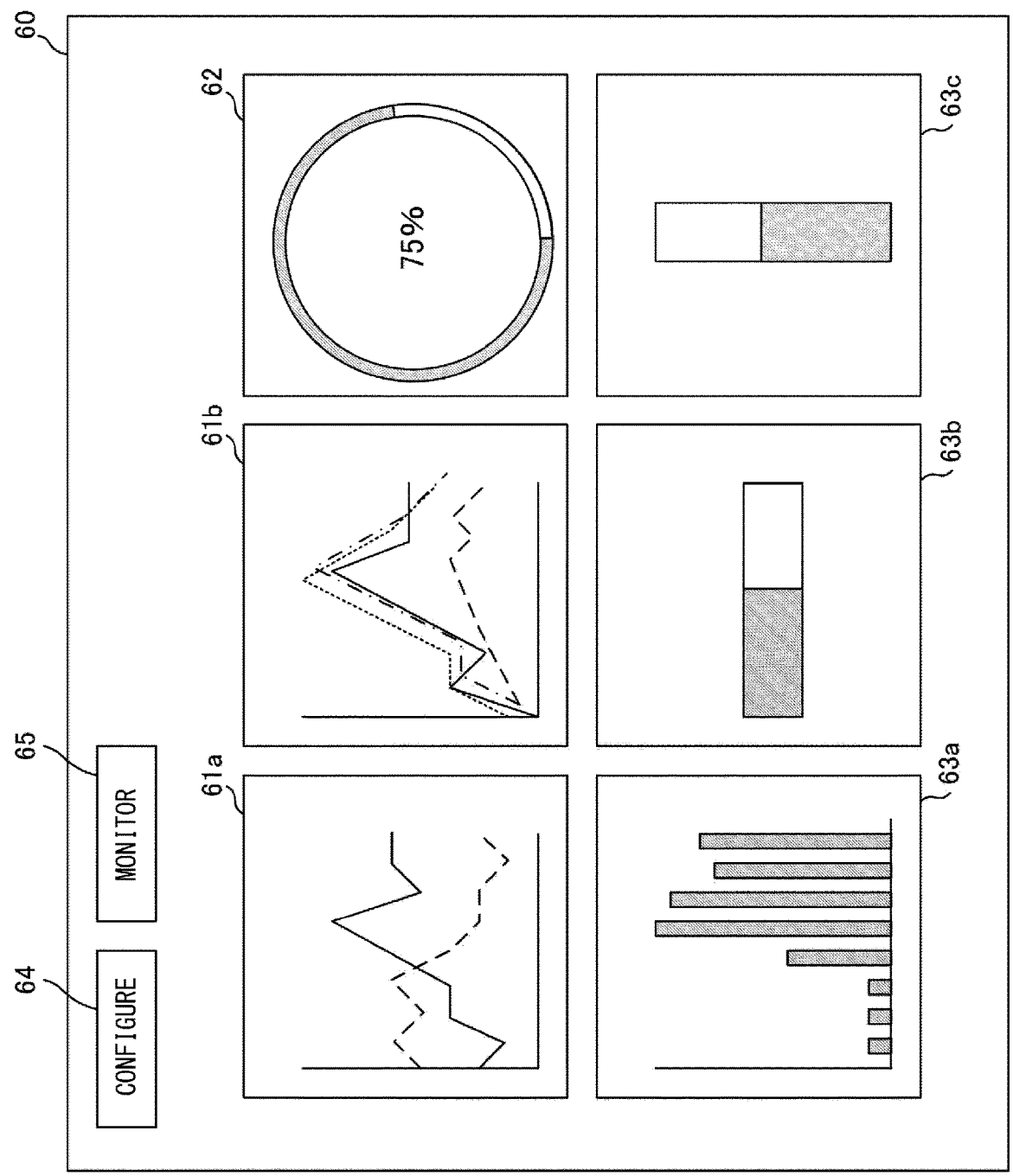
FIG. 5 is a diagram for describing charts.

FIG. 5 shows a display screen 60. The display screen 60 includes one or more charts showing the measurement result from the sensor 10. A line chart 61a is a chart showing a trend in measurement result (e.g. a flow rate) acquired by a sensor 10a. A line chart 61b is a chart showing a trend in measurement result (e.g. a flow rate) acquired by a sensor 10b. A meter chart 62 is a chart (pie chart) showing a measurement result (e.g. pressure) acquired by the sensor 10b. A bar chart 63a is a chart showing a trend in measurement result (e.g. a flow rate) acquired by the sensor 10a. A bar chart 63b is a bar chart showing a distance acquired by a sensor 10c (e.g. a range sensor). A bar chart 63c is a bar chart showing a measurement result (e.g. a height correlated with the amount of contents) acquired by a sensor 10d (e.g. a level sensor).

Herein, the creation part 25 identifies the data format and the chart type associated with the pair of the device ID and the output format acquired from the sensor 10 by reference to the display form table 32 and creates the display screen 60 in accordance with the data format and the chart type thus identified. The display screen 60 created by the creation part 25 may be changed in accordance with a configuration made by the user. For example, upon detection that a configuration button 64 displayed on the display screen 60 is clicked or touched, the creation part 25 may display a configuration screen on which the selection of a chart type, the selection of a sensor type, the selection of process data, the setting of a parameter, and the like are accepted and accept such a configuration made by the user via the configuration screen. The selection of process data may correspond to, for example, a process of selecting a bit related to ON/OFF of a control signal for the sensor 10 and displaying ON/OFF associated with the bit thus selected on the screen. In the setting of a parameter, a parameter such as a threshold or response time of the sensor 10 connected to the remote IO device 1 may be set. When the user has finished making such a change, the user clicks on or touches a monitor button 65 (a button that issues an instruction for returning to the screen on which the chart showing the measurement result is displayed). Upon detection of the operation of the monitor button 65, the creation part 25 creates the display screen 60 that reflects configuration information on the chart type and the like changed by the user and displays the display screen 60 instead of the configuration screen. The creation part 25 may store configuration data changed by the user in a non-volatile storage area of the storage device 30a. When the remote IO device 1 is, for example, rebooted, the creation part 25 may create the display screen 60 based on the configuration data changed by the user.

(Display of Error Information)

When an error occurs in the sensor 10, the sensor 10 transmits, to the remote IO device 1, error information showing that the error has occurred. The content of the error differs in a manner that depends on the type of sensor 10. For example, when the sensor 10 is a range sensor, information such as information showing that an object to be detected is located out of a detectable range (too close to be detected), information showing a failure in reception of light reflected off the object to be detected, or information showing a flow of an overcurrent may be transmitted to the remote IO device as the error information. When the sensor 10 is a pressure sensor, information such as information showing a flow of an overcurrent, information showing that it is above a displayable range, or information showing that it is below the displayable range may be transmitted to the IO device as the error information. When the sensor 10 is a flow meter, information such as information showing that settings have been changed in a sensor body, information showing that a flow direction is opposite to a set flow direction, information showing that an error has occurred in the sensor body, or information showing a flow of an overcurrent may be sent to the remote IO device the as the error information. Such error information on the sensor 10 is associated with the error ID in advance, and the remote IO device may be configured to acquire the error ID and detect the error occurring in the sensor 10 by associating the error ID with the error table to be described later. As described above, since the content of the error differs in a manner that depends on the type of sensor 10, information required for the user to perform troubleshooting on the sensor 10 in which the error has occurred also differs in a manner that depends on the type of sensor 10 and the type of error. Therefore, the remote IO device 1 may be configured to acquire the device ID of the sensor 10 and the error ID and provide, to the PC 15, a display screen (error UI) showing an error name and a relevant document describing explanatory information on the error associated with the pair of the device ID and the error ID. UI is an abbreviation for user interface.

FIG. 6 shows the error table 33. The device ID is identification information on the sensor 10. The error ID is identification information for use in identifying an error that has occurred in the sensor 10. The error name is information briefly showing the content of the error. The relevant document is a document (e.g. a PDF file or a web page) describing the explanatory information (a cause, a solution, and the like) on the error, link data, or the like. The CPU 20a acquires the device ID and the error ID from the sensor 10 in which the error has occurred and acquires the error name and the relevant document associated with the pair of the device ID and the error ID by reference to the error table 33. In addition, the CPU 20a creates a display screen including the error name and the relevant document and provides the display screen to the PC 15. The PC 15 displays the display screen on the display part 6. When the relevant document is link data, the CPU 20b may access, upon a click on the link data on the display screen with the operation part 7, a PDF file or a web page in accordance with the link data and display the PDF file or the web page on the display part 6.

Figure 7:
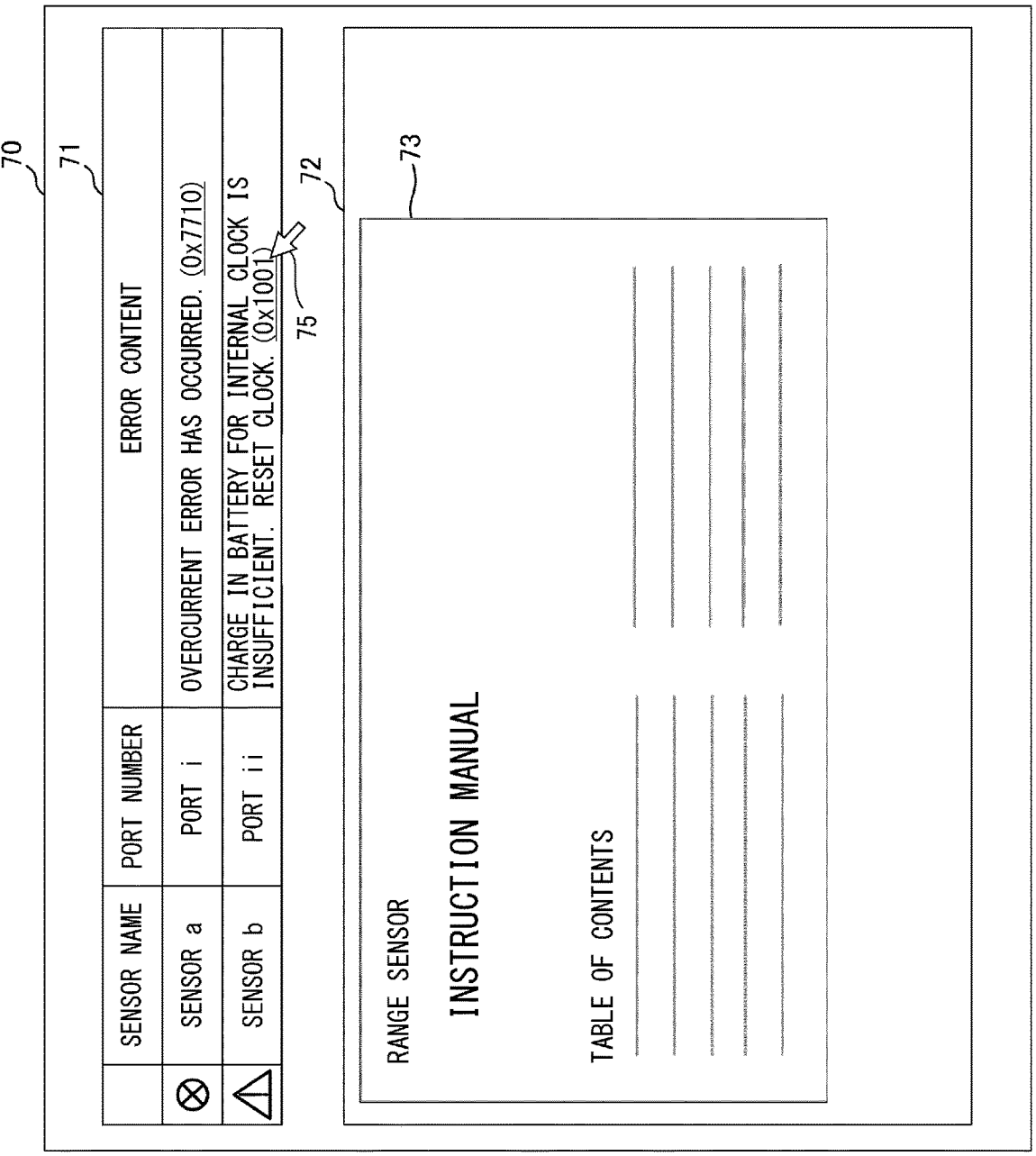
FIG. 7 is a diagram for describing an error UI.

FIG. 7 shows an error UI 70. The error UI 70 includes an error content display area 71 and an error detail display area 72. In the error content display area 71, an error icon, a sensor name, a port number, and an error content are displayed. The error icon is an image that visually shows severity of the error. The sensor name is a sensor name of the sensor 10 in which the error has occurred, and is identified based on the device ID. The port number is identification information on a port to which the sensor 10 in which the error has occurred is connected among a plurality of connectors (ports) included in the first connector 2. The error content is simple explanatory information identified based on the error ID. The error content may include an error code with a link. When a pointer 75 that moves in response to the operation of the operation part 7 clicks on the error code with a link, the CPU 20*b* displays detailed information (e.g. a document such as a PDF file or a web page) 73 linked to the error code on the display area 72. This will allow the user to easily understand how to eliminate the error.

(Flowchart)

Figure 8:
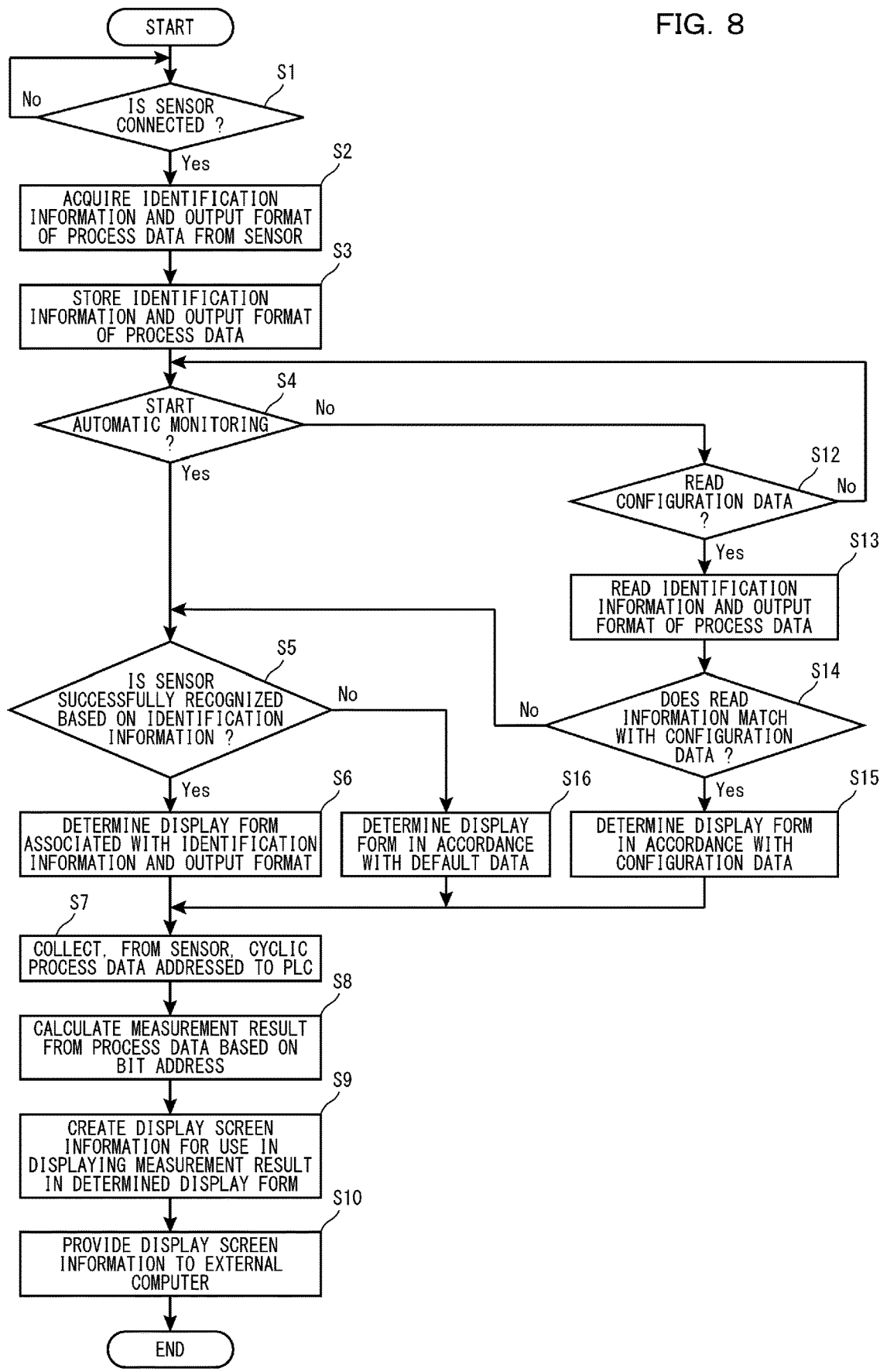
FIG. 8 is a flowchart showing how to provide display screen information.

FIG. 8 shows a provision process of providing the display screen information to be performed by the CPU 20*a*. Each step is basically executed on each sensor 10 connected to the first connector 2. Further, it is assumed that the measurement result from the sensor 10 is cyclically acquired, stored in the relay memory 22, and transferred (relayed) to the PLC 5. This relay process is performed in parallel with the provision process of providing the display screen information. Further, the provision process may be invoked when the PC 15 makes access to the web server 26 of the remote IO device 1.

In S1, the CPU 20*a* (ID acquisition part 24) determines whether the sensor 10 is connected to the first connector 2. When at least one sensor 10 is connected to the first connector 2, the CPU 20*a* proceeds to step S2. Herein, the remote IO device 1 may have a function of determining or detecting whether the sensor 10 is connected to the first connector 2. This connection detection function is in operation regardless of whether the provision process is executed.

When power is supplied to the remote IO device 1, the connection detection function outputs an acknowledgement signal from the first connector 2 to the sensor 10. Upon receipt of the acknowledgement signal from the remote IO device 1, the sensor 10 transmits a response signal. When failing to receive the response signal to the acknowledgement signal, the connection detection function determines that the sensor 10 is not connected to the first connector 2. On the other hand, upon receipt of the response signal, the connection detection function determines that the sensor 10 is connected to the first connector 2. In this case, the connection detection function may transmit a command to the sensor 10 to cause the sensor 10 to transmit the device type. This will be described in detail in step S2. When the sensor 10 is disconnected from the first connector 10, the connection detection function is unable to receive the response signal from the sensor 10. Therefore, when failing to receive the response signal from the sensor 10, the connection detection function determines that the sensor 10 has been disconnected from the first connector 10.

In S2, the CPU 20*a* (ID acquisition part 24) transmits, to the sensor 10 via the communication circuits 21*a*, 21*d*, a request to transmit the device ID and the output format of the process data stored in the storage device of the sensor 10 to acquire the device ID and the output format of the process data from the sensor 10.

In S3, the CPU 20*a* (ID acquisition part 24) stores the device ID and the output format of the process data acquired from the sensor 10 in the storage device 30*a* of the remote IO device 1.

In S4, the CPU 20*a* determines whether to start automatic monitoring based on the selection made by the user. The automatic monitoring is a mode in which the CPU 20*a* automatically determines the type of the sensor 10 and the display form and generates the display screen 60. When the user selects the automatic monitoring, the CPU 20*a* proceeds to step S5. On the other hand, when the user does not select the automatic monitoring, the CPU 20*a* proceeds to step S12.

In S12, the CPU 20*a* determines whether to read the configuration data stored in the storage device 30*a* in accordance with the selection made by the user. The configuration data is a kind of user customization data, and may be data created in advance through the operation of the configuration button 64. The user may designate a configuration data (configuration file) to be read. When the user selects to read the configuration data, the CPU 20*a* reads the configuration data and then proceeds to step S13. When the user does not select to read the configuration data, the CPU 20*a* returns to step S4.

In S13, the CPU 20*a* reads the identification information on the sensor 10 and the output format of the process data acquired from the sensor 10 and stored in the storage device 30*a*.

In S14, the CPU 20*a* determines whether the identification information and the output format thus read match with the identification information and the output format included in the configuration data. When the matching fails, the CPU 20*a* proceeds to S5. On the other hand, when the matching succeeds, the CPU 20*a* proceeds to S15.

In S15, the CPU 20*a* determines the display form of the display screen 60 in accordance with the configuration data. The CPU 20*a* then proceeds to S7.

In S5, the CPU 20*a* determines whether the type of the sensor 10 has been successfully recognized (identified) based on the identification information acquired from the sensor 10. When the type has been successfully recognized, the CPU 20*a* proceeds to S6. On the other hand, when the type has failed to be recognized, the CPU 20*a* proceeds to S16. In S16, the CPU 20*a* determines the display form based on identification information and output format included in default data prestored in the storage device 30*a*. The default data may be data for use in forcibly displaying the measurement result in, for example, a line chart. The CPU 20*a* then proceeds to S7.

In S6, the CPU 20*a* (creation part 25) determines the display form associated with the identification information and the output format acquired from the sensor 10 and stored in the storage device 30*a* of the remote IO device 1. For example, the creation part 25 determines the display form (e.g. a chart type) associated with the pair of the identification information and the output format by reference to the display form table 32. When the display form table 32 cannot be referred to (for example, there is no table associated with the device ID), the CPU 20*a* may display the display screen 60 in a chart of a predetermined chart type (e.g. a line chart).

In S7, the CPU 20*a* (information collection part 23) collects, from sensor 10, cyclic process data (received information) addressed to the PLC. Information addressed from the sensor 10 to the PLC is temporarily stored in the relay memory 22. Then, the received information stored in the information collection part 23 is collected by extraction (copy). The information collection part 23 may collect all data to be transmitted to the PLC, and the CPU 20*a* may update the display screen 60 based on the data thus collected. The intervals at which data is transmitted to the PLC may be different from the intervals at which the information collection part 23 collects the process data. For example, when the intervals at which the data is transferred to the PLC are each several milliseconds (ms) long, and the intervals at which the process data for generating the display screen is collected are each several hundred milliseconds (ms) long, the load applied to the remote IO device 1 when the provision process of providing the display screen is performed will be reduced.

In S8, the CPU 20*a* (creation part 25 or information collection part 23) calculates the measurement result from the received information thus collected. The creation part 25 identifies the bit address where the measurement result is stored based on the output format, interprets the data format of the process data included in the display form table, and calculates the measurement result from the process data based on the bit address thus identified.

In S9, the CPU 20*a* (creation part 25) creates the display screen information for use in displaying the measurement result in the display form thus determined. For example, the creation part 25 may acquire, based on the display form (chart type) identified in S2, template data (sample data) of the display form from the storage device 30*a* and create the display screen information by adding the measurement result to the template data. Examples of the display screen information include html data, css data, script data, and the like for use in displaying a chart.

In S10, the CPU 20*a* (web server 26) provides the display screen information to the PC 15 that is an external computer. The web server 26 transmits the display screen information (e.g. a web application such as html data, css data, and script data) to the web browser of the PC 15. Upon receipt of the display screen information, the CPU 20*b* of the PC 15 displays the display screen 60 on the display part 6 based on the display screen information. Note that the measurement result displayed in a chart may be updated in real time. In this case, the CPU 20*b* periodically makes access to the web server 26 to acquire updated display screen information and updates the display screen 60 based on the updated display screen information.

Figure 9:
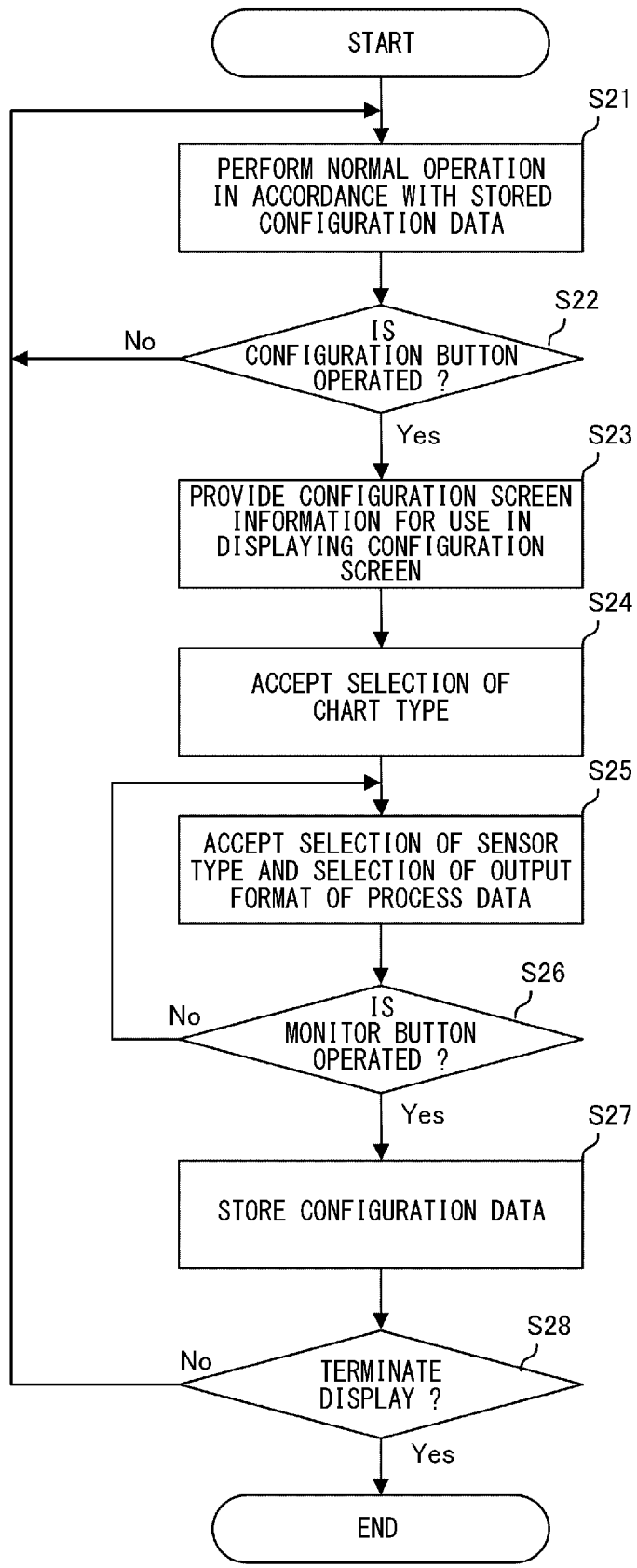
FIG. 9 is a flowchart showing a display and configuration of a display screen.

FIG. 9 is a flowchart showing the display of the display screen 60 and configuration change.

In S21, the CPU 20*a* performs normal operation in accordance with the stored configuration data. Herein, the normal operation includes the processes from S6 (that may be S15 or S16) to S10 in the series of processes shown in FIG. 8.

In S21, the CPU 20*a* determines whether the configuration button 64 is operated (e.g. click, touch, or the like). When the configuration button 64 is not operated, the CPU 20*a* returns to S21. On the other hand, when the configuration button 64 is operated, the CPU 20*a* proceeds to S23.

In S23, the CPU 20*a* (web server 26) provides configuration screen information for use in displaying the configuration screen to the PC 15 that is an external computer. The web server 26 transmits the configuration screen information (e.g. a web application such as html data, css data, and script data) to the web browser of PC 15. Upon receipt of the configuration screen information, the CPU 20*b* of the PC 15 displays the configuration screen on the display part 6 based on the configuration screen information.

In S24, the CPU 20*a* accepts the selection of a chart type via the configuration screen displayed on PC 15.

In S25, the CPU 20*a* accepts the selection of a sensor type and the selection of an output format of the process data via the configuration screen displayed on PC 15.

In S26, the CPU 20*a* determines whether the monitor button 65 is operated (e.g. click, touch, or the like). When the monitor button 65 is not operated, the CPU 20*a* returns to S25. On the other hand, when the monitor button 65 is operated, the CPU 20*a* proceeds to S27.

In S27, the CPU 20*a* creates the configuration data including the chart type, the sensor type, and the output format of the process data and stores the configuration data in the storage device 30*a*.

In S28, the CPU 20*a* determines whether the termination of display has been selected by the user. When the termination of display is selected, the CPU 20*a* terminates the provision process of providing the display screen information. On the other hand, when the termination of display is not selected, the CPU 20*a* returns to S21. This causes the display screen 60 to be updated to a display screen that reflects the configuration made by the user.

(Other)

According to the above-described embodiment, the display screen information is created in the remote IO device 1. However, the remote IO device 1 may be responsible for collecting the measurement result and the error information, and the PC 15 may be responsible for creating and displaying the display screen information. For example, a configuration may be employed where the storage device 30*b* of the PC 15 is made larger in storage capacity than the storage device 30*a* of the remote IO device 1 so as to allow information for which the capacity of the remote IO device alone is insufficient to be provided to the user.

Figure 10:
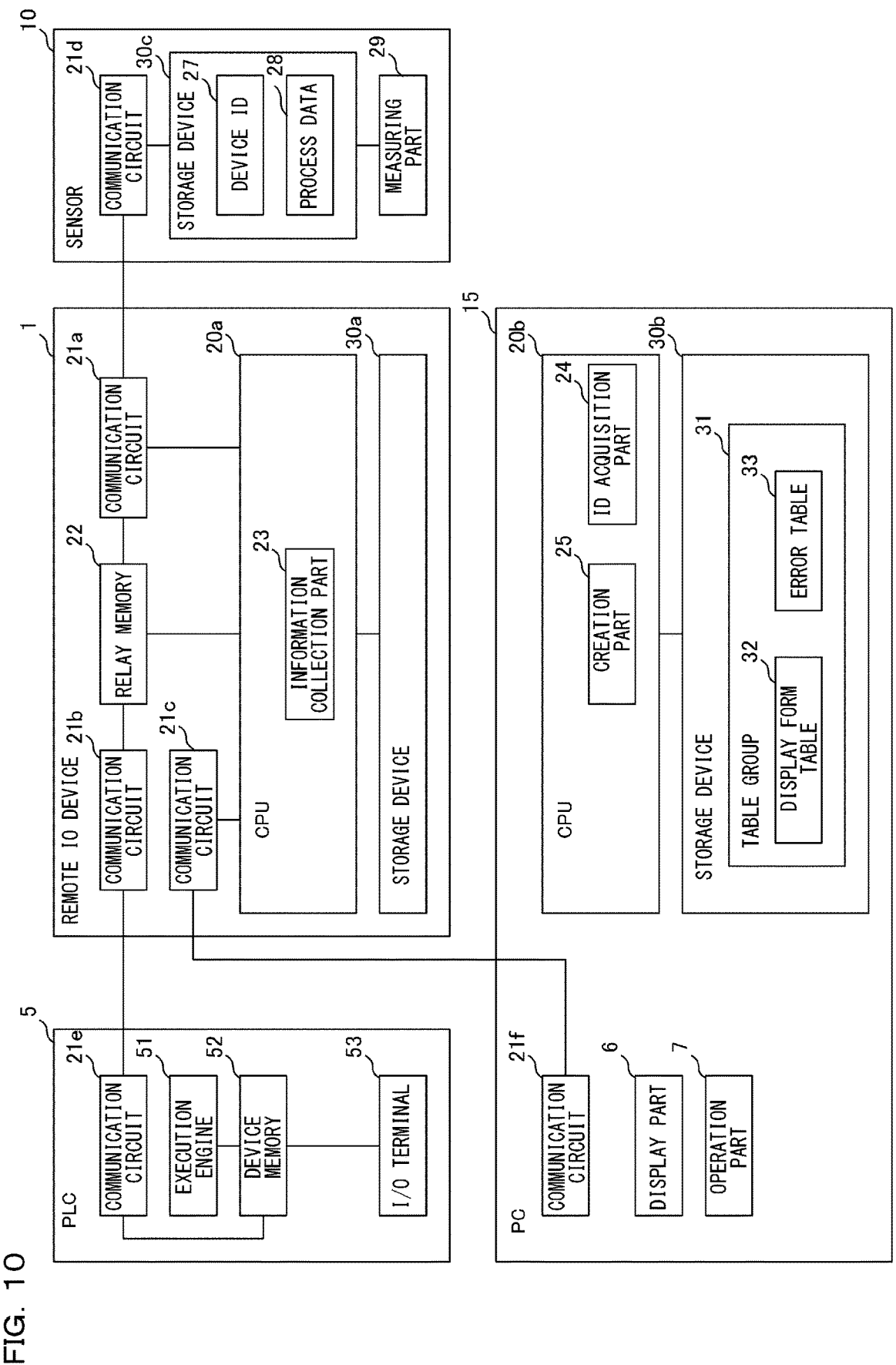
FIG. 10 is a diagram for describing other hardware.

In this case, as shown in FIG. 10, the ID acquisition part 24 and the creation part 25 may be implemented by the CPU 20*b* of the PC 15. That is, the storage device 30*b* may store an application program that causes the PC 15 to serve as the ID acquisition part 24, the creation part 25, and the like. The CPU 20*b* executes the application program to implement the ID acquisition part 24 and the creation part 25. Further, the table group 31 and the template data for a chart may be stored in the storage device 30*b* of the PC 15 as a part of the application program.

The CPU 20*b* (ID acquisition part 24) acquires, from each sensor 10, the device ID of the sensor 10 and the output format via the remote IO device 1. The CPU 20*b* (creation part 25) identifies the chart type associated with the device ID and the output format by reference to the display form table 32. The CPU 20*b* acquires the measurement result from the process data acquired and transferred by the information collection part 23. The CPU 20*b* identifies the bit address of the measurement result associated with the device ID and the output format and extracts the measurement result from the bit address thus identified. The CPU 20*b* (creation part 25) creates the display screen information for use in displaying the measurement result in the chart type thus determined. Further, the CPU 20*b* displays the display screen 60 on the display part 6 based on the display screen information. The CPU 20*b* may repeatedly make access to the remote IO device 1 to acquire the measurement result and update the display screen 60. Furthermore, the display screen 60 may be changed later in accordance with the configuration made by the user.

(Flowchart for PC Application)

Figure 11:
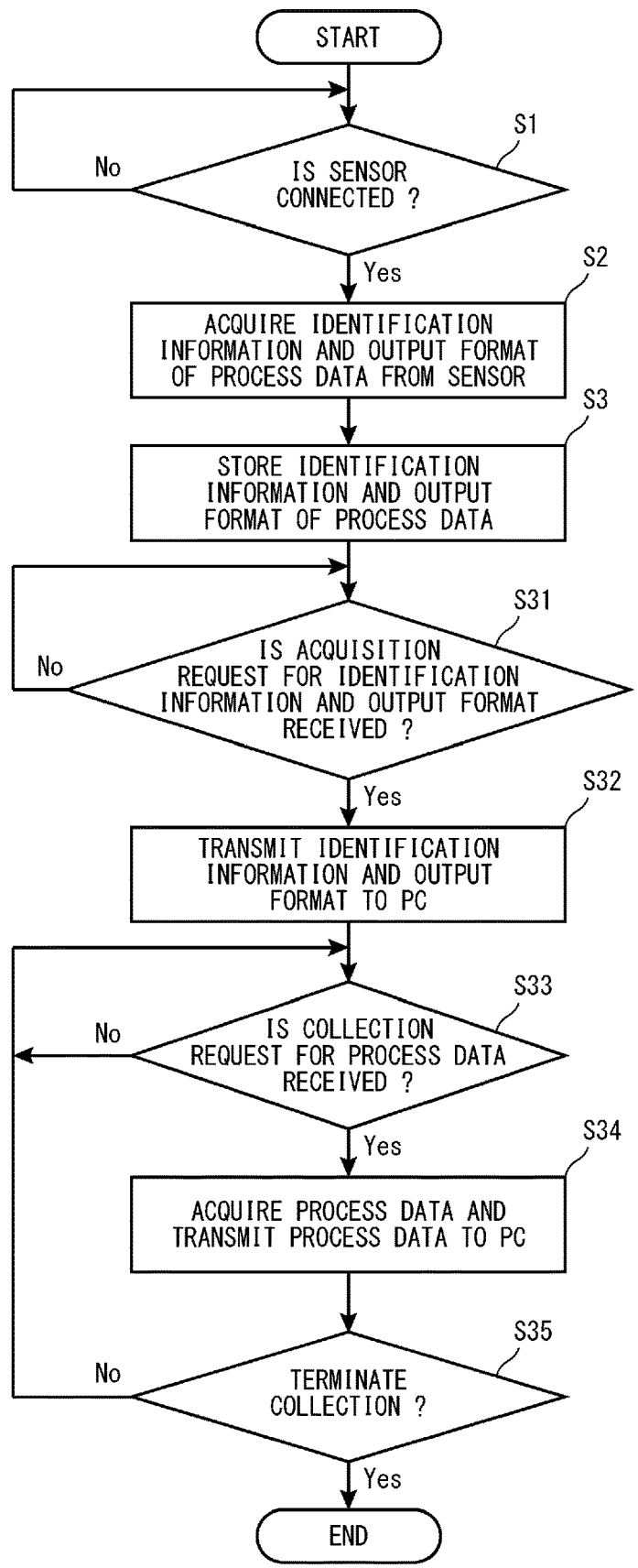
FIG. 11 is a flowchart showing a process to be performed by a remote IO device.
Figure 12:
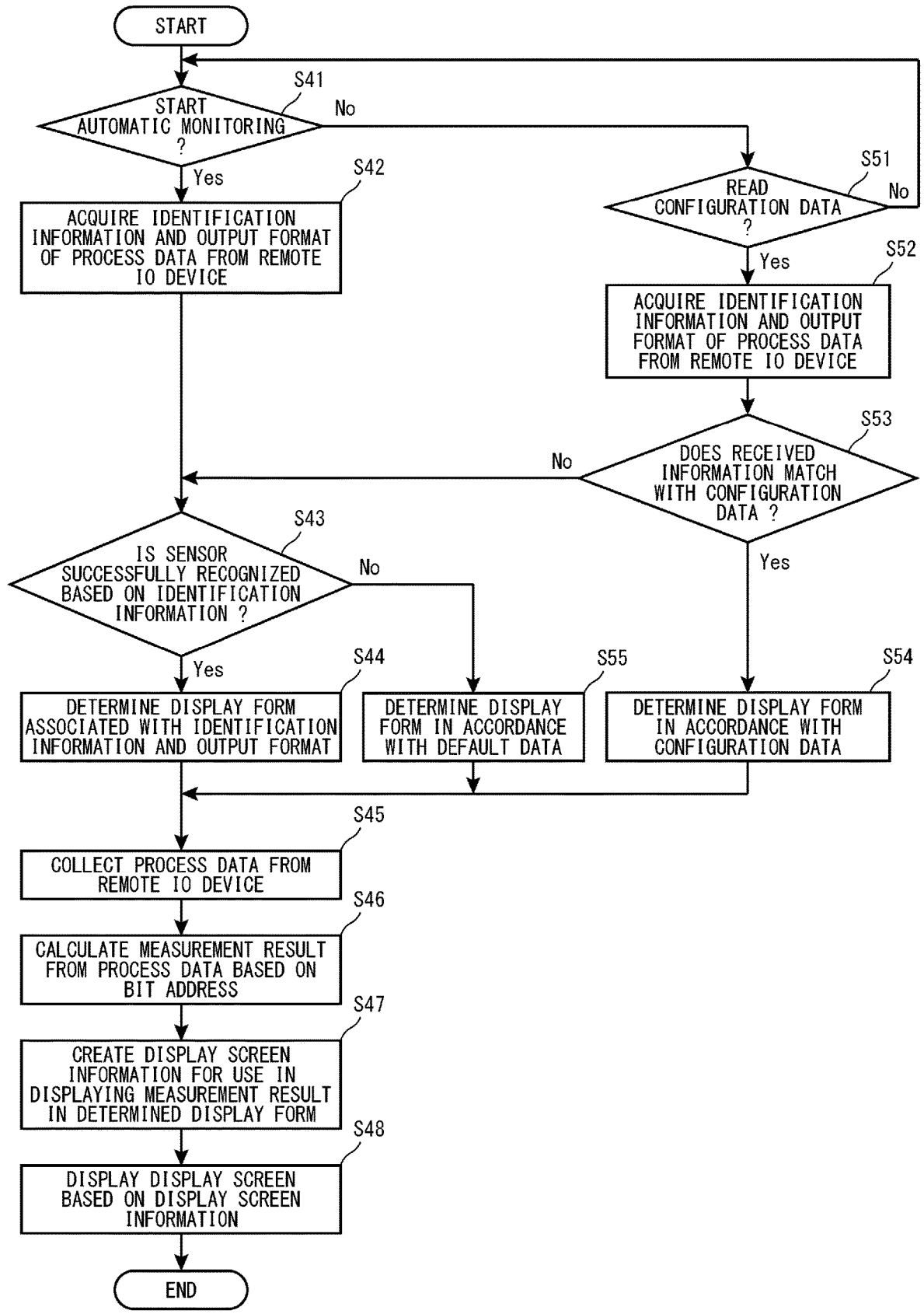
FIG. 12 is a flowchart showing a process in accordance with an application program.

FIG. 11 shows a provision process of providing the identification information, the output format, and the process data to be performed by the CPU 20*a* of remote IO device 1. FIG. 12 shows a provision process of providing the display screen information to be performed by the CPU 20*b* of PC 15. FIGS. 11 and 12 basically inherit the terms related to FIGS. 8 and 9 and incorporate the description given of FIGS. 8 and 9. Each step is basically executed on each sensor 10 connected to the first connector 2. Further, it is assumed that the measurement result from the sensor 10 is cyclically acquired, stored in the relay memory 22, and transferred (relayed) to the PLC 5. Further, the provision process may be invoked when the application program of the PC 15 is executed.

As shown in FIG. 11, the CPU 20a of the remote IO device 1 executes the above-described S1 to S3 in advance. As a result, the identification information on the sensor 10 and the output format of the process data are stored in the storage device 30a.

In S31, the CPU 20a (information collection part 23) determines whether an acquisition request for the identification information on the sensor 10 and the output format of the process data has been received from the PC 15. Upon receipt of the acquisition request, the CPU 20a proceeds to S32.

In S32, the CPU 20a (information collection part 23) reads the identification information and the output format from the storage device 30a and transmits the identification information and the output format to the PC 15.

In S33, the CPU 20a (information collection part 23) determines whether a collection request for the process data has been received from the PC 15. Upon receipt of the collection request, the CPU 20a proceeds to S34. Note that the collection request may be periodically transmitted from the PC 15. Alternatively, a collection start request and a collection termination request may be transmitted from the PC 15. Upon receipt of the collection start request, the information collection part 23 starts to periodically collect the process data. Upon receipt of the collection termination request, the information collection part 23 terminates the collection of the process data.

In S34, the CPU 20a (information collection part 23) acquires, from sensor 10, the process data addressed to PLC 5 and transmits the process data to PC 15. For example, the CPU 20a (information collection part 23) requests the transmission of the process data stored in the storage device 30c of the sensor 10 via the communication circuits 21a, 21d. The transmission request (transmission command) for the process data may be made at predetermined intervals. In this case, the CPU 20a may determine whether each predetermined interval has elapsed and make, when determining that the interval has elapsed, the transmission request for the process data. Upon receipt of the transmission request for the process data from the remote IO device 1, the sensor 10 transmits the process data 28 stored in the storage device 30c to the relay memory 22 of the remote IO device 1. The information collection part 23 extracts (copies) the received information temporarily stored in the relay memory 22 addressed from the sensor 10 to the PLC 5 and collects the received information.

In S35, the CPU 20a (information collection part 23) determines whether a collection termination condition has been satisfied. The collection termination condition may be, for example, the receipt of a collection termination command from the PC 15. When the collection termination condition is not satisfied, the CPU 20a returns to S33. When the collection termination condition is satisfied, the CPU 20a terminates the provision process shown in FIG. 11.

As shown in FIG. 12, the CPU 20b of the PC 15 performs the following process in accordance with a PC application (application program) stored in the storage device 30b.

In S41, the CPU 20b determines whether to start the automatic monitoring based on the selection made by the user. The automatic monitoring is a mode in which the CPU 20b automatically determines the type of the sensor 10 and the display form and generates the display screen 60. When the user selects the automatic monitoring, the CPU 20b proceeds to step S42. On the other hand, when the user does not select the automatic monitoring, the CPU 20b proceeds to step S51.

In S51, the CPU 20b determines whether to read the configuration data for use in reflecting a customization made by the user based on the selection made by the user. When determining that the configuration data is not read, the CPU 20b returns to S41. On the other hand, when determining that the configuration data is read, the CPU 20b reads the configuration data from the storage device 30b and proceeds to S52.

In S52, the CPU 20b acquires the identification information on sensor 10 and the output format of the process data from the remote IO device 1. For example, the CPU 20b (acquisition part 24) transmits an acquisition request for the identification information on the sensor 10 and the output format of the process data to the PC 15 and receives the identification information and the output format from the PC 15.

In S53, the CPU 20b determines whether the identification information and the output format thus acquired match with the identification information and the output format included in the configuration data stored in the storage device 30b. When the matching fails, the CPU 20b proceeds to S43. On the other hand, when the matching succeeds, the CPU 20b proceeds to S54.

In S54, the CPU 20b determines the display form of the display screen 60 based on the configuration data. The CPU 20b then proceeds to S45.

Now, upon selection of the automatic monitoring, the CPU 20b executes S42. In S42, the CPU 20b acquires the identification information on the sensor 10 and the output format of the process data from the remote IO device 1. For example, the CPU 20b (acquisition part 24) transmits an acquisition request for the identification information on the sensor 10 and the output format of the process data to the PC 15 and receives the identification information and the output format from the PC 15.

In S43, the CPU 20b determines whether the type of the sensor 10 has been successfully recognized (identified) based on the identification information acquired from the sensor 10. When the type has been successfully recognized, the CPU 20b proceeds to S44. On the other hand, when the type has failed to be recognized, the CPU 20b proceeds to S55. In S55, the CPU 20b determines the display form based on the identification information and the output format included in configuration data prestored in the storage device 30b. The CPU 20b then proceeds to S45.

In S44, the CPU 20b (creation part 25) determines the display form associated with the identification information and the output format acquired from the sensor 10 via the remote IO device 1 and stored in the storage device 30b. For example, the creation part 25 determines the display form (e.g. a chart type) associated with the pair of the identification information and the output format by reference to the display form table 32. When the display form table 32 cannot be referred to (for example, there is no table associated with the device ID), the CPU 20b may display the display screen 60 in a chart of a predetermined chart type (e.g. a line chart).

In S45, the CPU 20b (creation part 25) collects the process data from the CPU 20a of the remote IO device 1. For example, the CPU 20b may transmits, to the remote IO device 1, a collection request for the process data to cause the remote IO device 1 to transmit the process data to the PC 15.

In S46, the CPU 20b (creation part 25) extracts the measurement result from the process data transmitted from the CPU 20a (information collection part 23). The creation part 25 identifies the bit address where the measurement result is stored based on the output format, interprets the data format of the process data included in the display form table, and calculates the measurement result from the process data based on the bit address thus identified.

In S47, the CPU 20b (creation part 25) creates the display screen information for use in displaying the measurement result in the display form thus determined. For example, the creation part 25 may acquire, based on the display form (chart type) identified in S44, S54, or S55, template data (sample data) of the display form from the storage device 30b, and create the display screen information by adding the measurement result to the template data. Examples of the display screen information include html data, css data, script data, and the like for use in displaying a chart.

In S48, the CPU 20b (application program) generates the display screen information and displays the display screen 60 on the display part 6 based on the display screen information. Note that the measurement result displayed in a chart may be updated in real time. In this case, the CPU 20b periodically makes access to the information collection part 23 to acquire updated display screen information and updates the display screen 60 based on the updated display screen information.

Note that the CPU 20b may change the configuration of the display screen 60 by performing the process shown in FIG. 9. This allows the user to change the display form to suit preferences of the user through the application program executed on the PC 15. In this case, the configuration file describing the display form and the like is stored in the storage device 30b. The CPU 20b may perform monitoring of the measurement result (display of the display screen 60) based on the configuration file thus stored.

SUMMARY

As shown in FIG. 1 and the like, the first connector 2 is an example of a first connection part to which one or more sensors 10 are connected. The second connector 3 is an example of a second connection part to which the industrial network 11 for use in communication with the control device (e.g. the PLC 5) is connected. As shown in FIG. 2 and the like, the relay memory 22 is an example of a relay memory that temporarily stores the received information (e.g. the process data) received from the one or more sensors connected to the first connection part to relay the received information to the control device via the second connection part. The third connector 4 is an example of a third connection part to which the computer network for use in communication with an external computer (e.g. the PC 15) is connected. The third connector 4 may be an antenna for use in wireless communication or a wireless communication circuit. That is, the connection may mean both a wired connection and a wireless connection. The creation part 25 is an example of a creation unit that creates the display screen information for use in displaying the received information stored in the relay memory in a predetermined display form. The web server 26 is an example of a provision unit that provides the display screen information to the external computer via the third connection part. As described above, according to the present embodiment, the user can browse through the measurement result from the sensor 10 on the external computer without going through the PLC 5. This enhances the usability when browsing through the measurement result from the sensor 10 on the external computer.

The received information may include received information including one or more measurement results acquired by the one or more sensors 10 and received information including the identification information on the one or more sensors. The received information including the measurement result and the received information including the identification information may be received simultaneously, or alternatively, may be received separately. The creation part 25 may create the display screen information for use in displaying one or more measurement results based on the display form associated with the identification information on the one or more sensors 10. As described above, the display form is identified based on the identification information on the sensor 10, which reduces the time and effort required for the user to identify the display form.

As shown in FIG. 5 and the like, the display form may be a chart for use in displaying each of the one or more measurement results. The chart will be useful for the user to visually understand the measurement result. There is another advantage that a chart suitable for the sensor 10 is selected.

The display form table 32 is an example of a display form table that stores an association between the identification information on the one or more sensors 10 and the display form. The creation part 25 may identify the display form associated with the identification information on the one or more sensors 10 by reference to the display form table based on the identification information on the one or more sensors 10. The use of the display form table 32 will allow the display form to be easily identified.

As shown in FIG. 4, the display form table 32 may store, for example, the identification information on the one or more sensors, the display form, and the output format in a manner where the identification information on the one or more sensors, the display form, and the output format are associated with each other. The creation part 25 may identify the display form associated with the output format and the identification information on the one more sensors received from the one or more sensors 10 by reference to the display form table. This will allow the measurement result to be accurately extracted from the received information such as the process data.

The creation part 25 may identify the data format of the received information based on the identification information on the one or more sensors. The creation part 25 may create the display screen information by extracting the one or more measurement results from the received information in accordance with the data format thus identified. As shown in FIG. 4, the data format may include a bit address indicating a bit position where each of the one or more measurement results is stored in the received information. This will allow the measurement result to be accurately extracted from the received information such as the process data.

As shown in FIG. 4, the display form table may store an association between the identification information on the one or more sensors and the bit address. The creation part 25 may identify the bit address associated with the identification information on the one or more sensors by reference to the display form table based on the identification information on the one or more sensors and extract the one or more measurement results from the received information based on the bit address thus identified. This will allow the measurement result to be accurately extracted from the received information such as the process data.

As shown in FIG. 4, the data format may include type information showing each data type of the one or more measurement results in the received information. The data type of the measurement result may be reflected in a chart.

As shown in FIG. 4, the display form may include at least one of a line chart, a bar chart, a meter chart, or lighting and extinguishing of a lamp. Such display forms will allow the user to easily grasp the measurement result and the like.

As shown in FIG. 6, the received information may include error identification information (e.g. the error ID) showing an error that has occurred in the one or more sensors 10. As shown in FIG. 7, the creation part 25 may create the display screen information for use in displaying the error that has occurred in the one or sensors based on the display form associated with the error identification information. The display screen (e.g. the error UI 70) displayed based on the display screen information may include the name of the error and the explanatory information on the error. This will allow the user to easily understand the error that has occurred in the sensor 10.

The error table 33 that stores the identification information on the one or more sensors 10, the error identification information, the name of the error, and the explanatory information on the error in a manner where the identification information on the one or more sensors 10, the error identification information, the name of the error, and the explanatory information on the error are associated with each other may be further provided. The creation part 25 may identify the name of the error and the explanatory information on the error associated with the identification information on the one or more sensors and the identification information on the error received from the one or sensors 10 by reference to the error table and create the display screen information including the name of the error and the explanatory information on the error. The use of the error table 33 will allow information on the error to be easily acquired.

The provision unit may be the web server 26. The web server 26 provides the display screen information to a web browser running on the external computer. This will save the user from having to install a special display application program on the PC 15.

The predetermined device memory 52 where the one or measurement results acquired by the one or more sensors 10 are stored and an address of a storage area in the relay memory 22 where the one or more measurement results are stored may be associated with each other in advance.

A display system including a data relay device that relays the measurement result acquired by the sensor 10 to the control device, and an external computer that displays the measurement result extracted by the data relay device may be provided.

The data relay device (e.g. the remote IO device 1) may include a transmission unit (e.g. the communication circuit 21c) that collects the received information stored in the relay memory and transmits the received information to the external computer. The external computer (e.g. the PC 15) may include a reception unit (e.g. the communication circuit 21f) that receives the received information from the data relay device, a creation unit (e.g. the CPU 20b, the creation part 25) that creates the display screen information for use in displaying the received information in a predetermined display form, and a display unit (e.g. the display part 6) that displays the display screen including the measurement result from the sensor based on the display screen information.

The CPUs 20a, 20b and the creation part 25 may change the display screen information based on the display form selected in accordance with user operation. The CPUs 20a, 20b may be configured to provide the display screen information thus changed to the PC 15 or the display part 6.

The remote IO device 1 is an example of the data relay device connected to a display device (e.g. the PC 15). The display device (e.g. the PC 15) may include the display form table 32, the creation unit (e.g. the CPU 20b), and the display part 6. The display form table 32 may be a table that stores an association among sensor identification information for use in identifying a sensor, format information where the sensor identification information on the sensor, a bit address assignment associated with the output format of the received information received from the sensor, and the output format of the received information received from the sensor are associated with each other, and the display form of the measurement result included in the received information. The creation unit (e.g. the CPU 20b) may identify, based on the sensor identification information and the output format of the received information, the display form associated with the sensor identification information and the bit address associated with the measurement result included in the received information by reference to the display form table 32, and create the display screen of the measurement result calculated based on a result of the identification. The display part 6 may be a display device or a display with a touchscreen that displays the display screen created by the creation unit. The data relay device may further include the following components.

The connector 4 is an example of a display device connection part to which the display device is connected. The connector 2 is an example of a sensor connection part to which one or more sensors are connected. The connector 3 is an example of a control device connection part to which the industrial network 11 for use in communication with the control device (e.g. the PLC 5) is connected. The ID acquisition part 24 is an example of a first acquisition unit that acquires the sensor identification information on the one or more sensors via the sensor connection part. The storage device 30a is an example of a storage unit that stores the sensor identification information acquired by the first acquisition unit. The information collection part 23 is an example of a second acquisition unit that acquires the received information received from the one or more sensors at predetermined first intervals via the sensor connection part, the received information including the measurement result from the sensor. The relay memory 22 is an example of a relay memory that temporarily stores the received information acquired by the second acquisition unit to relay the received information to the control device via the control device connection part. The CPU 20a and the communication circuit 21b may serve as a first transmission unit that transmits the received information stored in the relay memory to the control device via the control device connection part at predetermined second intervals. The CPU 20a and the communication circuit 21c may serve as a second transmission unit that transmits, upon receipt of a transmission command for the sensor identification information transmitted from the display device, the sensor identification information stored in the storage unit to the display device via the display device connection part.

The second transmission unit (e.g. the CPU 20a and the communication circuit 21c) may further transmit the received information to the display device in accordance with a transmission command for the received information generated by the display device.

The data relay device (the CPU 20a, the communication circuit 21a) may transmit a data transmission command to the one or sensors at the first predetermined intervals. For example, the predetermined first intervals may be shorter than the predetermined second intervals. This will reduce the load applied when transferring the received information to the display device. As described above, the first intervals at which the remote IO device 1 acquires information from the sensor 10 and the second intervals at which the remote IO device 1 transmits information to the PLC 5 may be the same or different. When the first intervals are longer than the second intervals, the number of pieces of data acquired by the PLC 5 becomes small, and a data processing load applied to the PLC 5 becomes small accordingly. When the first intervals are shorter than the second intervals, the PLC 5 can acquire the value of the sensor 10 without fail.

The first transmission unit (the CPU 20a, the communication circuit 21b) may transmit the received information at the second intervals that correspond to control intervals of the control device. The second transmission unit may transmit the received information from the one or sensors to the display device at third intervals (that may be different from the first intervals or the second intervals).

The PC 15 is an example of the display device connected to the data relay device (i.e. the remote IO device 1) via the display device connection part (e.g. the connector 4). The data relay device may include the sensor connection part (e.g. the connector 2) to which the one or sensors are connected, the control device connection part (e.g. the connector 3) to which the industrial network for use in communication with the control device is connected, the relay memory 22 that temporarily stores the received information including the measurement results received from the one or more sensors connected to the sensor connection part to relay the received information to the control device via the control device connection part, and the display device connection part (e.g. the connector 4) to which the computer network is connected.

The CPU 20b, the communication circuit 21f, and the ID acquisition part 24 serve as a first reception unit that receives the sensor identification information on the one or sensors connected to the data relay device via the sensor connection part from the data relay device via the display device connection part.

The CPU 20b, the communication circuit 21f, and the creation part 25 serve as a second reception unit that receives the received information including the measurement result received by the data relay device via the sensor connection part from the data relay device via the display device connection part.

The display form table 32 stored in the storage device 30b serves as a display form table that stores an association between the format information where the sensor identification information received by the first reception unit, the bit address assignment associated with the output format of the received information received from the one or more sensors, and the output format of the received information received from the one or more sensors are associated with each other, and the display form of the measurement result included in the received information.

The CPU 20b and the creation part 25 serve as a creation unit that identifies, based on the sensor identification information received by the first reception unit, the display form associated with the sensor identification information and the bit address associated with the measurement result included in the received information by reference to the display form table, and creates the display screen of the measurement result calculated based on a result of the identification.

The display part 6 serves as a display part that displays the display screen created by the creation unit.

The CPU 20b and the creation part 25 may identify the data format of the received information based on the sensor identification information, calculate the measurement result from the received information in accordance with the data format thus identified, and create the display screen.

The CPU 20b and the creation part 25 may serve as a display form changing unit that changes the display form identified by reference to the display form table.

The first reception unit (e.g. the CPU 20b, the ID acquisition part 24) may receive the sensor identification information acquired by and stored in the data relay device.

The CPU 20b and the communication circuit 21f may serve as an error identification information reception unit that receives the error identification information generated by the one or more sensors. The error table 33 may serve as an error table that stores the sensor identification information received by the first reception unit, the error identification information received by the error identification information reception unit, the name of the error, and the explanatory information on the error in a manner where the sensor identification information, the error identification information, the name of the error, and the explanatory information on the error are associated with each other.

What is claimed is:

1. A display device to be connected, via a display device connection interface, to a data relay device including: a sensor connection interface for connecting a sensor to receive first data from the sensor; a control device connection interface to be connected with an industrial network for communicating with a control device; a relay memory configured to store the first data received from the sensor via the sensor connection interface to relay the first data to the control device via the control device connection interface; and the display device interface, the display device comprising:
   a first reception unit that receives a sensor identification associated with the sensor connected to the data relay device via the sensor connection interface from the data relay device via the display device connection interface;
   a second reception unit that receives the first data including a measurement result received from the data relay device via the sensor connection interface from the data relay device via the display device connection interface;
   a display form table that stores one or more associations, each of the one or more associations between a sensor identification, a data format of the first data and a display form associated with the first data;
   a creation unit that identifies the display form associated with the measurement result based on the sensor identification received by the first reception unit and the display form table, and generate a second data representing a display screen for displaying the measurement result based on the first data received by the second reception unit, the display form identified and the data format of the first data; and
   a display part that displays the display screen in accordance with the second data created by the creation unit.

2. The display device according to claim 1, wherein
   the each of the plurality of associations includes an association between a sensor identification, an output format of the first data, a data format of the first data and a display form associated with the first data, and the creation unit generates the second data representing the display screen for displaying the measurement result based on the first data received by the second reception unit, the display form identified the output format of the first data and the data format of the first data.

3. The display device according to claim 1, wherein the data format includes a bit address indicating a bit position where the measurement result is stored in the first data, and the creation unit identifies the bit address of the first data based on the sensor identification received by the first reception unit, and extracts the measurement result from the first data received by the second reception unit in accordance with the bit address identified to generate the second data.

4. The display device according to claim 1, further comprising a display form changing unit that changes the display form identified by reference to the display form table.

5. The display device according to claim 1, wherein the first reception unit receives the sensor identification acquired by the data relay device.

6. The display device according to claim 1, further comprising:

a third reception unit that receives error identification information generated by the sensor; and an error table that stores one or more error associations, each of the one or more error associations between a sensor identification, an error identification, a name of an error, and explanatory information on the error, wherein the creation unit generates the second data representing the display screen for displaying the name of an error, and the explanatory information on the error based on the error table, the sensor identification received by the first reception unit, and the error identification received by the third reception unit.

7. A data relay device comprising:

a first connection interface for connecting a sensor to receive first data from the sensor;

a second connection interface to be connected with an industrial network for communicating with a control device;

a relay memory configured to store the first data received from the sensor via the first connection interface to relay the first data to the control device via the second connection interface;

a display form table that stores a plurality of associations, each of the plurality of associations between an identification associated with a sensor and a display form;

a third connection interface to be connected with a computer network for communicating with an external; and a processor configured to identify the display form according to the identification associated with the sensor received via the first connection interface based on the display form table, and generate a second data representing a display screen for displaying the first data based on the display form identified, and configured to provide the second data to the external computer via the third connection interface.

8. The data relay device according to claim 7, wherein the first connection interface receives the first data includes a measurement result provided from the sensor, and an identification associated with the sensor, and the processor generates the second data representing the display screen for displaying the measurement result provided from the sensor based on a display form according to the identification received via the first connection interface.

9. The data relay device according to claim 7, wherein the each of the plurality of associations includes an association between the identification associated with the sensor, the display form, and an output format, and the processor identifies the display form according to the output format and the identification associated with the sensor received via the first connection interface based on the display form table.

10. The data relay device according to claim 7, wherein the processor identifies a data format of the first data based on the identification associated with the sensor received via the first connection interface and extracts the measurement result from the first data in accordance with the data format identified to generate the second data.

11. The data relay device according to claim 10, wherein the data format includes a bit address indicating a bit position where the measurement result is stored in the first data, the each of the plurality of associations includes an association between the identification associated with the sensor, the display form, and the bit address, and the processor identifies the bit address according to the identification associated with the sensor received via the first connection interface based on the display form table, and extracts the measurement result from the first data based on the bit address identified.

12. The data relay device according to claim 7, wherein the first data includes error identification information showing an error that has occurred in the sensor, and the processor generates the second data representing the display screen for displaying the error that has occurred in the sensor based on a display form according to the error identification information.

13. The data relay device according to claim 12, wherein the second data includes a name of the error and explanatory information on the error, the data relay device further comprising an error table that stores the identification associated with the sensor, the error identification information, the name of the error, and the explanatory information on the error in a manner where the identification associated with the sensor, the error identification information, the name of the error, and the explanatory information on the error are associated with each other, wherein the processor identifies the name of the error and the explanatory information on the error according to the identification associated with the sensor received via the first connection interface and the error identification information received from the sensor based on the error table and generates the second data representing the display screen for displaying the name of the error and the explanatory information on the error.

14. The data relay device according to claim 7, wherein an address of a memory area associated with the measurement result in the relay memory corresponds to a device memory in the control device where the measurement result are stored.

15. The data relay device according to claim 7, wherein the processor changes the second data based on a display form selected in accordance with user operation, and configured to provide the second data changed.

16. A data relay device to be connected to a display device including: a display form table that stores one or more associations, each of the one or more associations between a sensor identification, a data format of a first data and a display form associated with the first data; and
- a creation unit that identifies the display form associated with a measurement result based on the sensor identification received from the data relay device and the display form table, and generate a second data representing a display screen for displaying the measurement result based on the first data received from the data relay device, the display form identified and the data format of the first data, the data relay device comprising:
- a display device connection interface to be connected to the display device;
- a sensor connection interface for connecting a sensor to receive first data from the sensor;
- a control device connection interface to be connected with an industrial network for communicating with a control device;
- a first acquisition unit that acquires a sensor identification from the sensor via the sensor connection interface;
- a second acquisition unit that acquires first data including a measurement result received from the sensor at predetermined first intervals via the sensor connection interface;
- a relay memory configured to store the first data received from the sensor via the first connection interface to relay the first data to the control device via the second connection interface;
- a first transmission unit that transmits the first data stored in the relay memory to the control device via the control device connection interface at predetermined second intervals; and
- a second transmission unit that transmits, upon receipt of a transmission command from the display device, the sensor identification to the display device via the display device connection interface.

17. The data relay device according to claim 16, wherein the second transmission unit further transmits the first data to the display device in accordance with a transmission command for the first data generated by the display device.

18. The data relay device according to claim 16 configured to transmit a data transmission command to the one or more sensors at the predetermined first intervals.

19. The data relay device according to claim 16, wherein the predetermined first intervals are shorter than the predetermined second intervals.

20. The data relay device according to claim 16, wherein the first transmission unit transmits the first data to the control device at the second intervals that correspond to control intervals of the control device, and
the second transmission unit is configured to transmit the first data from the one or more sensors to the display device at third intervals.

* * * * *